July 29, 1930. H. D. HUMPHREY 1,771,849

BRAKE

Filed Oct. 30, 1926

INVENTOR
HOMER D. HUMPHREY
BY
*Jn. W. McConkey*
ATTORNEY

Patented July 29, 1930

1,771,849

UNITED STATES PATENT OFFICE

HOMER D. HUMPHREY, OF SOUTH BEND, INDIANA, ASSIGNOR TO BENDIX BRAKE COMPANY, OF CHICAGO, ILLINOIS, A CORPORATION OF ILLINOIS

BRAKE

Application filed October 30, 1926. Serial No. 145,146.

This invention relates to brakes and is illustrated as embodied in an internal expanding brake for a motor truck or similar heavy automotive vehicle. An object of the invention is to provide improved means for readily adjusting the anchor or anchors of the brake to insure that the shoes or equivalent retarding devices shall bear uniformly against the brake drum. In one desirable arrangement the anchoring means includes one or more pivots for the retarding devices, which serve as anchors and which are slidably positioned at their ends in slots substantially radially of the drum, although the exact position will depend on the design of the brake.

Preferably there is a support strong enough to take the torque of the brake, and which has parts on opposite sides of the retarding device which are provided with the above-described slots for the ends of the anchor pivot. In the arrangement shown in the drawing, the opposite ends of the pivot are provided with parts flattened on their sides so that they fit slidably in the slots. This type of anchorage is especially well adapted for a brake of the sort illustrated, in which there are two anchored shoes which are preferably overlapped in order to bring their friction surfaces as close together as possible at the anchored ends of the shoes, thus giving greater area of brake lining in engagement with the drum and at the same time minimizing drum distortion.

The above and other objects and features of the invention, including various novel and desirable details of construction, will be apparent from the following description of one illustrative embodiment shown in the accompanying drawing, in which.

Figure 1:
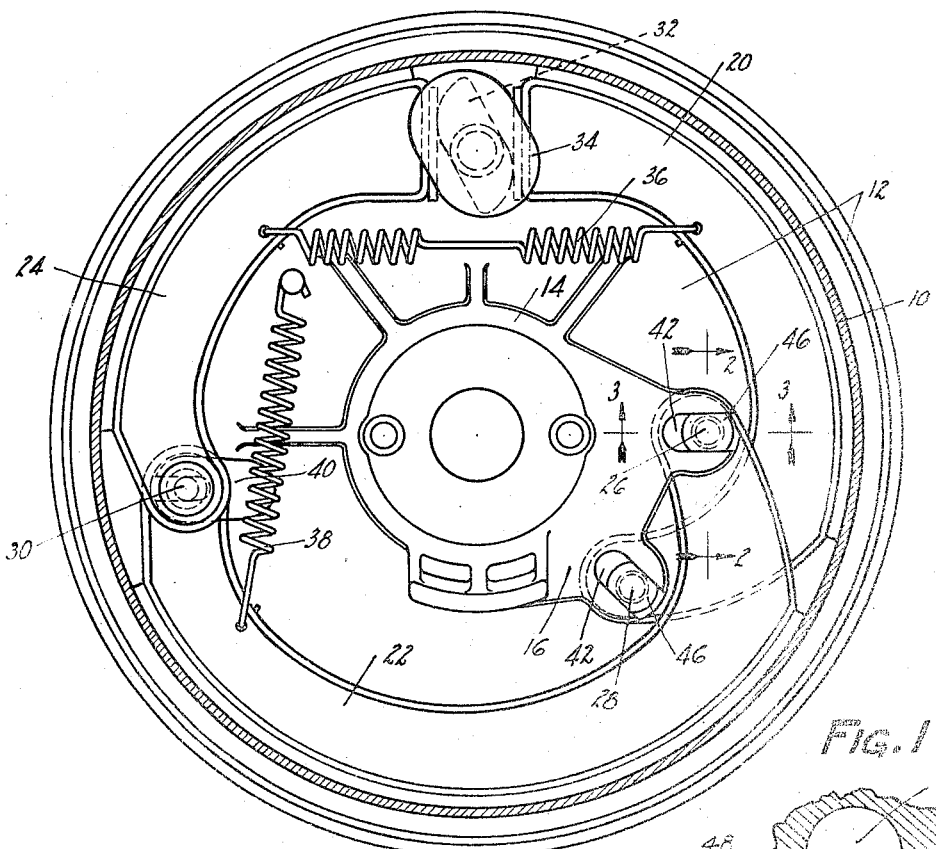
Figure 1 is a vertical section through the brake just inside the head of the brake drum and showing the brake shoes in side elevation.

The brake selected for illustration includes a drum 10 rotating with the wheel (not shown) and which is closed at its open side by a suitable backing plate or dust cover 12 which may be carried by or integral with a relatively heavy spider 14 carried by the axle and forming a very strong support for the brake, and which is formed with a pair of flanges 16 and 18 for the brake anchors.

The friction means of the illustrated brake includes three brake shoes or equivalent retarding devices 20, 22, and 24. Shoe 20 is anchored on a novel pivot member 26, and shoe 22 is anchored on a similar pivot member 28, while shoe 24 is connected to the unanchored end of the shoe 22 by a floating pivot 30. The brake may be applied by suitable means such as a double cam 32, shown as having an end flange 34 positioning the unpivoted ends of the shoes 20 and 24, the cam acting to force the shoes 20 and 24 apart to apply the brake against the resistance of a return spring 36. When the brake is applied the shoe 22 is operated by the shoe 24 against the resistance of an auxiliary return spring 38. When the brake is released the shoe 22 is swung inwardly by spring 38 to an idle position determined by a suitable stop 40.

Figures 2, 3, 4:
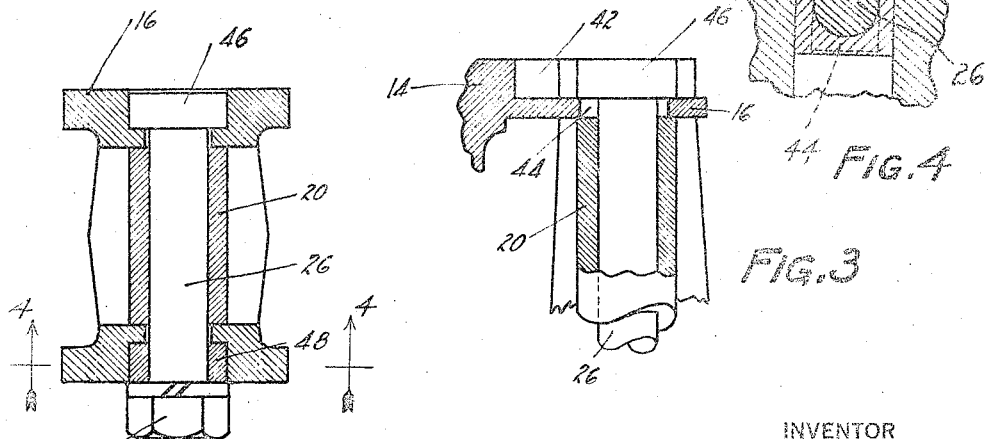
Figure 2 is a partial section on the line 2—2 of Figure 1 showing the mounting of one of the anchor pivots.
Figure 3 is a partial radial section on the line 3—3 of Figure 1 through the same anchor pivot as shown in Figure 2.
Figure 4 is a partial section through one anchor on the line 4—4 of Figure 2.

The present invention relates to the means for anchoring the shoes 20 and 22 or their equivalents. In the illustrated arrangement, the flanges 16 and 18 are formed with substantially radial slots 42 for parts at the ends of the pivots 26 and 28 which are flattened to be slidably received in the slots. I prefer that the slots should only extend part way through the flanges, as shown in Figure 3, the bottoms of the slots being formed with suitable elongated openings 44 giving ample clearance for pivots 26 and 28. In the arrangement illustrated, the flattened part at one end of each of the pivots 26 and 28 is in the form of an integral head 46 having parallel sides forming the flattened surfaces slidably engaging the slots, while at the other end of the pivot a squared spacer 48 may be provided to fit in the slot in the flange 18. The anchors are locked against movement in adjusted positions by a suitable means such as nuts 50 threaded on the ends of the pivots.

In the use of the above-described adjustable anchor pivots, it is ordinarily feasible to secure a semi-automatic adjustment of the pivots by loosening the nuts 50 and turning cam 32 to apply the brake. The shoes 20 and 22 are forced by the cam into close engagement throughout their friction faces with the inside of the drum 10, and this shifts the anchor pivots 26 and 28 slightly radially of the drum to the correct adjusted positions, whereupon the nuts 50 are tightened to preserve the adjustment so made.

While one illustrative embodiment of the invention has been described in detail, it is not my intention to limit its scope to that particular embodiment or otherwise than by the terms of the appended claims.

I claim:

1. A brake having a drum and a retarding device engageable with the drum and comprising, in combination therewith, a support having parts on opposite sides of said retarding device formed with slots extending radially of the drum, and a pivot for the retarding device passing through said slots.

2. A brake having a drum and a retarding device engageable with the drum and comprising, in combination therewith, a support having parts on opposite sides of said retarding device formed with slots extending radially of the drum, and a pivot for the retarding device passing through said slots and having at its opposite ends parts flattened on their sides to be received slidably in said slots.

3. A brake having a drum and a retarding device engageable with the drum, and comprising, in combination therewith, a support having parts on opposite sides of said retarding device formed with slots, a bolt passing through the retarding device and having a head with flattened sides slidably held in one of said slots, and a part on the end of the bolt opposite the head which is formed with flat sides slidably received in the other of said slots.

4. A brake having a drum and a retarding device engageable with the drum, and comprising, in combination therewith, a support having parts on opposite sides of said retarding device formed with slots extending part way through said parts and with openings in the bottoms of the slots, a bolt passing through the retarding device and through said openings and having a head with flattened sides slidably held in one of said slots, and a part on the end of the bolt opposite the head which is formed with flat sides slidably received in the other of said slots.

5. A brake having two retarding devices which overlap each other at their adjacent ends, and a drum engaged by said devices, and comprising, in combination therewith, a support having parts on opposite sides of both of said ends and formed with slots extending radially of the drum, and pivots for said ends having parts received in said slots.

6. A brake having two retarding devices with adjacent ends, and a drum engaged by said devices, and comprising, in combination therewith, a support having parts on opposite sides of both of said ends and formed with slots extending radially of the drum, and pivots for said ends having parts received in said slots.

7. A brake having two retarding devices with adjacent ends, and a drum engaged by said devices, and comprising, in combination therewith, a support having parts on opposite sides of both of said ends and formed with slots extending radially of the drum, and pivots for said ends having parts flattened on their sides and received in said slots.

8. A brake having two overlapping retarding devices, each having at one end a pivot between the ends of the other, at least one of said pivots including an abutment formed to permit radial sliding.

In testimony whereof, I have hereunto signed my name.

HOMER D. HUMPHREY.